US012002401B2

(12) United States Patent
Han et al.

(10) Patent No.: US 12,002,401 B2
(45) Date of Patent: Jun. 4, 2024

(54) GAMMA CORRECTION METHOD AND APPARATUS, ELECTRONIC DEVICE, AND READABLE STORAGE MEDIUM

(71) Applicants: Chengdu BOE Optoelectronics Technology Co., Ltd., Sichuan (CN); BOE Technology Group Co., Ltd., Beijing (CN)

(72) Inventors: Ting Han, Beijing (CN); Yuanzhang Zhu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/038,200

(22) PCT Filed: Dec. 14, 2020

(86) PCT No.: PCT/CN2020/136234

§ 371 (c)(1),
(2) Date: May 22, 2023

(87) PCT Pub. No.: WO2022/126337

PCT Pub. Date: Jun. 23, 2022

(65) Prior Publication Data

US 2024/0112616 A1 Apr. 4, 2024

(51) Int. Cl.
*G09G 3/20* (2006.01)
*G09G 3/3225* (2016.01)

(52) U.S. Cl.
CPC ......... *G09G 3/2007* (2013.01); *G09G 3/3225* (2013.01); *G09G 2300/0452* (2013.01);
(Continued)

(58) Field of Classification Search
None
See application file for complete search history.

(56) References Cited

U.S. PATENT DOCUMENTS 8,624,942 B2 1/2014 Jeon
2015/0145894 A1 5/2015 Kim et al.
(Continued)

FOREIGN PATENT DOCUMENTS

CN 104505010 A 4/2015
CN 106023916 A 10/2016
(Continued)

OTHER PUBLICATIONS

International Search Report for PCT/CN2020/136234 dated Jul. 26, 2021.

*Primary Examiner* — Christopher J Kohlman
(74) *Attorney, Agent, or Firm* — Ling Wu; Stephen Yang; Ling and Yang Intellectual Property

(57) ABSTRACT

A gamma correction method and apparatus, electronic device and readable storage medium. The method comprises: controlling a first display area (21) to display a test picture (S11); performing gamma correction on first display area to obtain first gamma correction data (S12); according to first gamma correction data, controlling a second display area (22) to display the test picture (S13); acquiring current display brightness corresponding to the test picture displayed in second display area (S14); when current display brightness is the same as that corresponding to a preset pixel grayscale displayed in first display area, determining remapping parameters of second display area according to grayscale brightness corresponding to second display area when current display brightness is displayed and preset pixel grayscale (S15); according to remapping parameters, compensating first gamma correction data to obtain second
(Continued)

gamma correction data (S16); according to second gamma correction data, controlling second display area to display (S17).

20 Claims, 11 Drawing Sheets

(52) U.S. Cl.
CPC ............... *G09G 2320/0233* (2013.01); *G09G 2320/0673* (2013.01); *G09G 2360/16* (2013.01)

(56) References Cited

U.S. PATENT DOCUMENTS

| | | | | |
|---|---|---|---|---|
| 2016/0180765 | A1 | 6/2016 | Hwang et al. | |
| 2018/0204529 | A1 | 7/2018 | Chen | |
| 2019/0130844 | A1 | 5/2019 | Yang et al. | |
| 2021/0134242 | A1* | 5/2021 | Hei | G09G 5/02 |
| 2021/0343258 | A1* | 11/2021 | Kim | G09G 3/3275 |
| 2022/0139336 | A1* | 5/2022 | Jeon | H10K 59/65 345/694 |
| 2022/0366832 | A1* | 11/2022 | Bae | G09G 3/2007 |

FOREIGN PATENT DOCUMENTS

| | | | |
|---|---|---|---|
| CN | 106782307 | A | 5/2017 |
| CN | 107665666 | A | 2/2018 |
| CN | 111968572 | A | 11/2020 |

* cited by examiner

GAMMA CORRECTION METHOD AND APPARATUS, ELECTRONIC DEVICE, AND READABLE STORAGE MEDIUM

CROSS-REFERENCE TO RELATED APPLICATION

The present application is a U.S. National Phase Entry of International Application No. PCT/CN2020/136234 having an international filing date of Dec. 14, 2020, the content of which is incorporated into this application by reference.

TECHNICAL FIELD

The present application relates to the field of display technologies, in particular to a gamma correction method and an apparatus, an electronic device and a readable storage medium.

BACKGROUND

With the development of the diversification of Active Matrix/Organic Light Emitting Diode (AMOLED) modules, an architecture of a same module with a variety of pixel arrangements in the screen display region appears, such as a current popular under-screen camera, that is, an ordinary AMOLED module is above the normal display region of the screen. Through the panel design, the region above the normal display region of the screen is subjected to a transparency treatment and changed to be arranged with half of the pixel points of the normal display region of the screen for display. The camera of the mobile phone is hidden here to achieve a full screen in the true sense.

Based on the existence of two different pixel arrangement designs on a same module, due to the pixel density, the low-density pixel region (L area) cannot achieve the effect of the high-density region in luminance and chrominance after gamma correction is carried out only for the high-density pixel region (H area). Therefore, it is needed to tune the H+L new display module in H area and L area with a gamma correction device. On the one hand, the tuning of two different regions requires the addition of a gamma correction device, and the addition of the device will greatly increase the production cost of the panel factory; on the other hand, the simultaneous displaying in H area and L area requires the display module to have a chip for configuring and adjusting high pixel and low pixel gamma registers, the development of the new chip is difficult, and has a long time period and it takes long time to pass verification.

SUMMARY

An implementation of the present application provides a gamma correction method and apparatus, an electronic device and a readable storage medium.

An implementation of the present application provides a gamma correction method for a display panel. The display panel includes a first display area and a second display area, a pixel density of the first display area is less than a pixel density of the second display area. The gamma correction method includes: controlling the first display area to display a test picture; performing gamma correction on the first display area to obtain first gamma correction data; controlling the second display area to display the test picture according to the first gamma correction data; acquiring a current display luminance corresponding to the test picture displayed by the second display area; determining a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area; compensating the first gamma correction data according to the remapping parameter to obtain second gamma correction data; and controlling the second display area to display according to the second gamma correction data.

In some implementations, determining the remapping parameter of the second display area based on the grayscale luminance corresponding to the current display luminance displayed in the second display area and the preset pixel grayscale, includes: determining a target pixel grayscale corresponding to the grayscale luminance of the current display luminance displayed in the second display area; determining the remapping parameter according to a ratio of the target pixel grayscale and the preset pixel grayscale.

In some implementations, the target pixel grayscale corresponding to the grayscale luminance of the current display luminance displayed in the second display area is calculated by the following conditional formula:

$$\frac{L_{vH-spec}}{L_{vi}} = \left(\frac{\text{Gray}_{H-spec}}{i}\right)^{Gamma}$$

Herein, $L_{vH-spec}$ is the grayscale luminance of the current display luminance displayed in the second display area, $L_{vi}$ is a grayscale luminance corresponding to the preset pixel grayscale displayed in the first display area, i is a value of the preset pixel grayscale, $\text{Gray}_{H-spec}$ is the target pixel grayscale corresponding to the grayscale luminance of the current display luminance displayed in the second display area, and Gamma is a gamma correction parameter value.

In some implementations, compensating the first gamma correction data according to the remapping parameter to obtain the second gamma correction data includes: compensating a pixel grayscale of the first gamma correction data according to the remapping parameter to obtain the second gamma correction data.

In some implementations, controlling the second display area to display according to the second gamma correction data includes: controlling the second display area to display according to the second gamma correction data based on a mura compensation algorithm.

In some implementations, performing the gamma correction on the first display area to obtain the first gamma correction data includes: tuning a plurality of pixel grayscale binding points from a highest pixel grayscale to a lowest pixel grayscale in the first display area respectively to obtain a plurality of grayscale luminances respectively corresponding to the plurality of pixel grayscale binding points; combining the plurality of pixel grayscale binding points and the grayscale luminances respectively corresponding to the plurality of pixel grayscale binding points to obtain the first gamma correction data.

In some implementations, the method further includes: controlling the first display area to display according to the first gamma correction data based on a mura compensation algorithm.

An implementation of the present application provides a gamma correction apparatus for a display panel, wherein the gamma correction apparatus is electrically connected with a collection apparatus, the display panel includes a first display area and a second display area, a pixel density of the first display area is less than a pixel density of the second display area. The gamma correction apparatus includes: a first control module, a first adjustment module, a second control module, an acquisition module, a determination module, a compensation module, and a second adjusting module. The first control module is configured to control the first display area to display a test picture. The first adjustment module is configured to perform gamma correction on the first display area to obtain first gamma correction data. The second control module is configured to control the second display area to display the test picture according to the first gamma correction data. The acquisition module is configured to acquire a current display luminance which corresponds to the test picture displayed by the second display area and is collected by the collection apparatus. The determination module is configured to determine a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area. The compensation module is configured to compensate the first gamma correction data according to the remapping parameter to obtain second gamma correction data. The second adjusting module is configured to control the second display area to display according to the second gamma correction data.

An implementation of the present application also provides an electronic device. The electronic device includes a processor and a memory storing a computer program, when the computer program is executed by the processor, the gamma correction method of any of the above implementations is implemented.

An implementation of the present application also provides a non-volatile computer-readable storage medium for a computer program. The gamma correction method of any of the above implementations is implemented when the computer program is executed by one or more processors.

Through the gamma correction method and apparatus, electronic device, and readable storage medium according to the present application, the first gamma correction data is compensated according to the remapping parameter to obtain the second gamma correction data, the gamma correction of different display regions in a display panel is realized, and the gamma characteristics of different regions are adjusted to a consistent state without the addition of a device and a new chip.

Additional aspects and advantages of implementations of the present application will be set forth partially in the following description, partially become apparent from the following description, or are understood by implementing the present application.

BRIEF DESCRIPTION OF DRAWINGS

The above and/or additional aspects and advantages of the present application will become apparent and readily understood from following description of the implementations in conjunction with the accompanying drawings.

DETAILED DESCRIPTION

Figure 1:
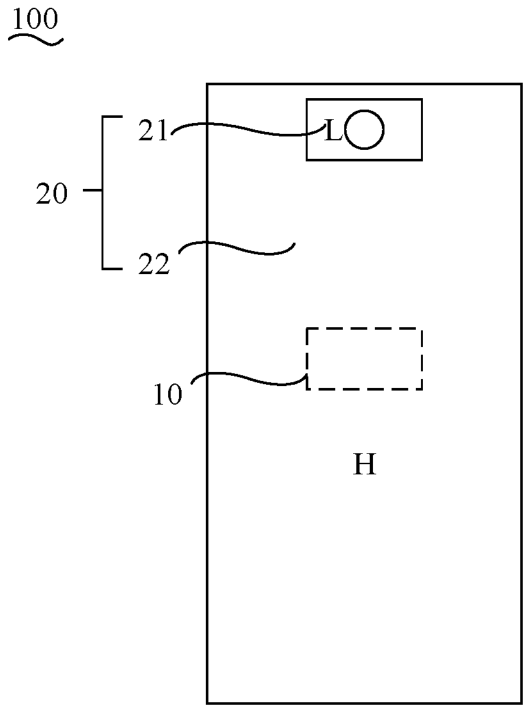
FIG. 1 is a schematic diagram of a structure of an electronic device according to some implementations of the present application.

Implementations of the present application are described in detail below, examples of which are illustrated in the accompanying drawings, in which identical or similar reference numerals denote identical or similar elements or elements having identical or similar functions throughout. The implementations described below with reference to the accompanying drawings are exemplary and are intended only to explain the implementations of the present application, but are not to be understood to limit the implementations of the present application.

Figure 3A:
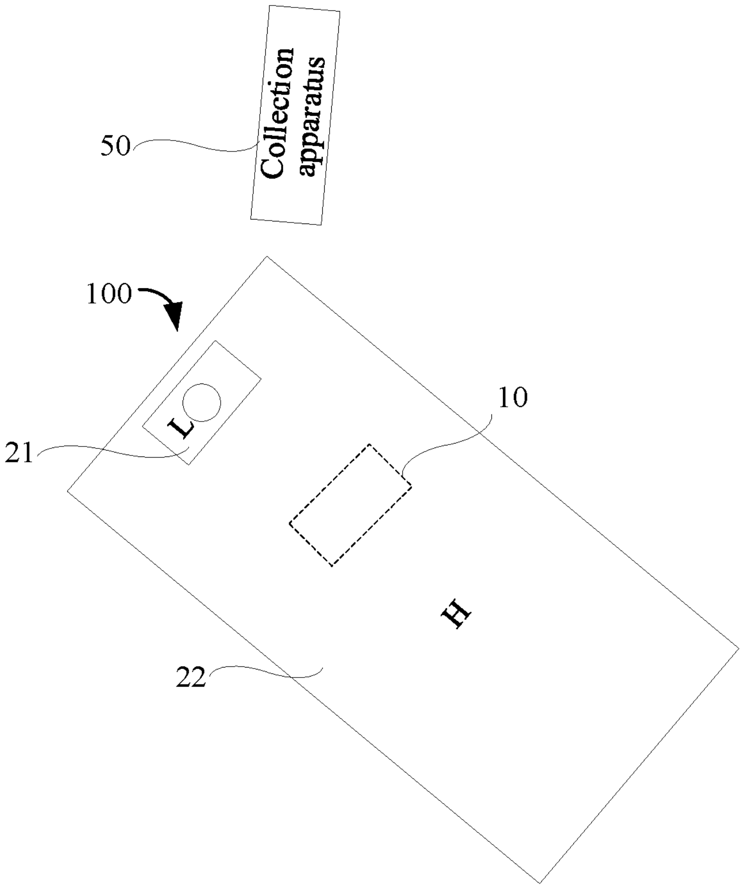
FIG. 3A is a schematic diagram of a scenario of a gamma correction method according to some implementations of the present application.
Figure 3B:
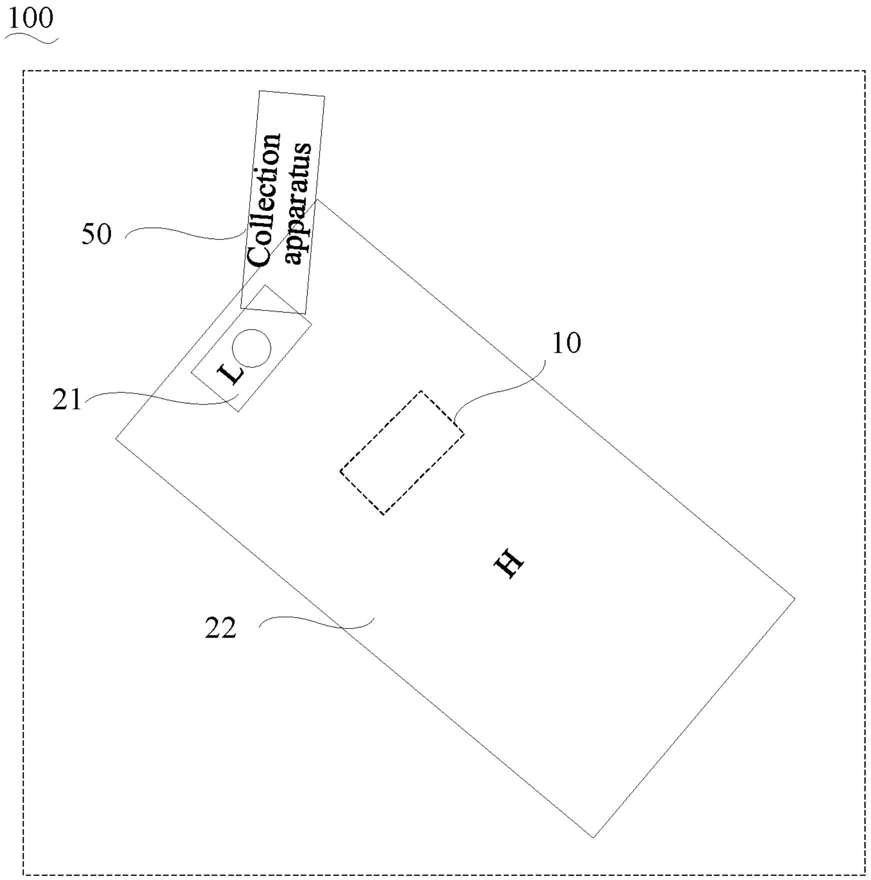
FIG. 3B is a schematic diagram of a scenario of a gamma correction method according to some implementations of the present application.
Figure 4:
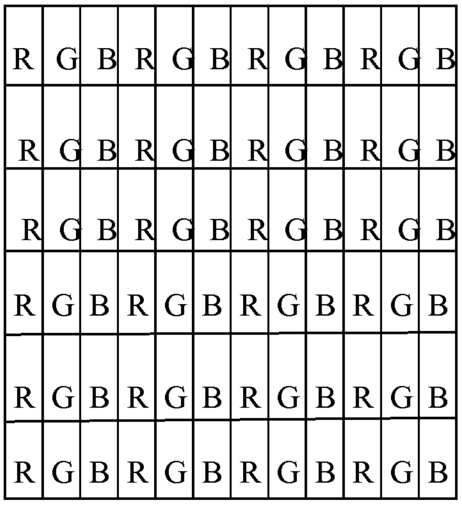
FIG. 4 is a schematic diagram of a structure of pixel points of a second display area according to some implementations of the present application.
Figure 5:
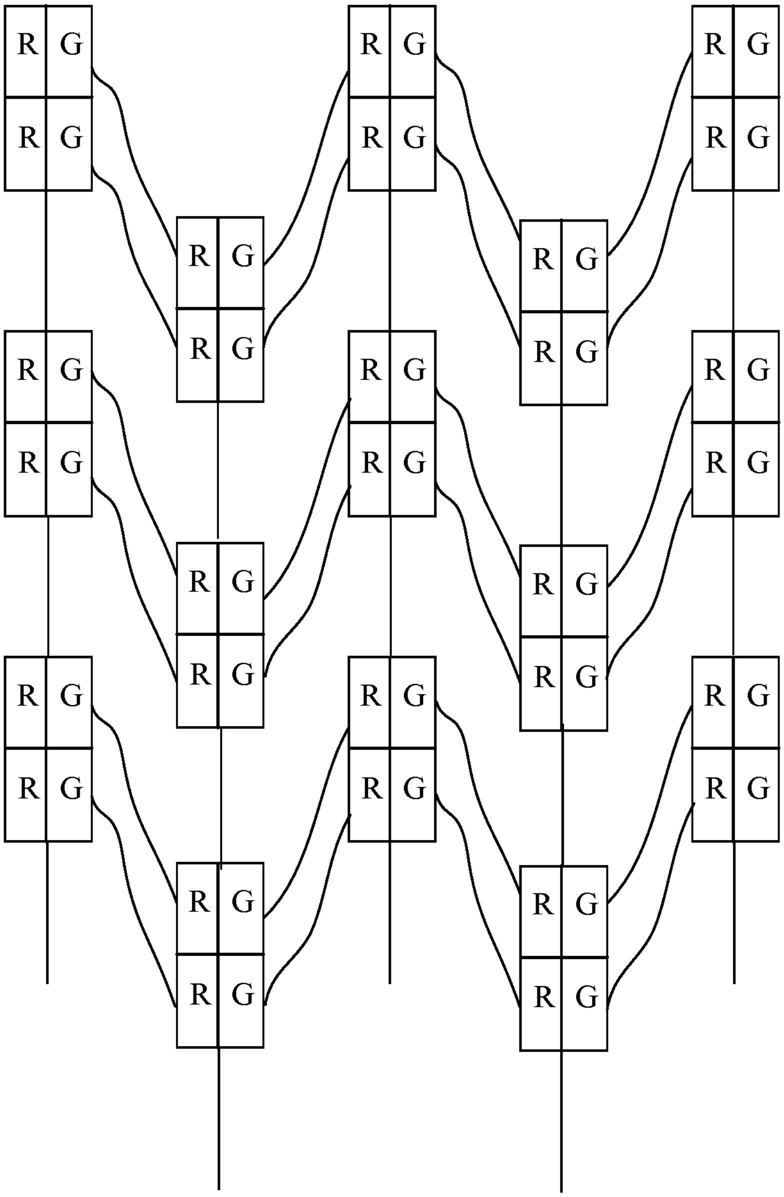
FIG. 5 is a schematic diagram of a structure of pixel points of a first display area according to some implementations of the present application.

Referring together to FIGS. 1 to 5, FIGS. 1 and 2 are schematic diagrams of architectures of the current novel display panel (AMOLED module with H area+L area), where H represents it is a normal display region, the pixel density arrangement of H area is as shown in FIG. 4, L represents it is a display area of the camera region, and the pixel density arrangement of L area is as shown in FIG. 5. For example, the high pixel density (High PPI) is about 398 and the low pixel density (Low PPI) is about 199. H+L represents that there is a display architecture combining two pixel densities, i.e., high and low pixel densities, in a module display region.

Based on the existence of two different pixel arrangement designs on a same module, due to the pixel density problem, the low-density pixel region (L area) cannot achieve the effect of the high-density region in luminance and chrominance after gamma correction is carried out only for the high-density pixel region (H area). Therefore, it is needed to tune the same H+L new display module in H area and L area with a gamma correction device. On the one hand, the tuning of two different regions requires the addition of a gamma correction device, and the addition of the device will greatly increase the production cost of the panel factory; on the other hand, the simultaneous displaying in H area and L area requires the display module to have a chip for configuring and adjusting high pixel and low pixel gamma registers, the development of the new chip is difficult, and has a long time period, and it takes long time to pass the verification.

Therefore, a gamma correction method for a display panel provided by the present application realizes gamma correction of different display regions in the display panel by compensating the first gamma correction data according to the remapping parameter to obtain the second gamma correction data, and can adjust gamma characteristics of different regions to a consistent state without the addition of a device and a new chip.

As will be understood, referring to FIG. 1, the display panel 20 is a display apparatus in an electronic device 100. The display panel 20 includes a first display area 21 and a second display area 22. A pixel density of the first display area 21 is less than a pixel density of the second display area 22. The electronic device 100 may be a smart device having a display panel, such as a mobile phone, a computer, an ipad, etc.

Figure 6:
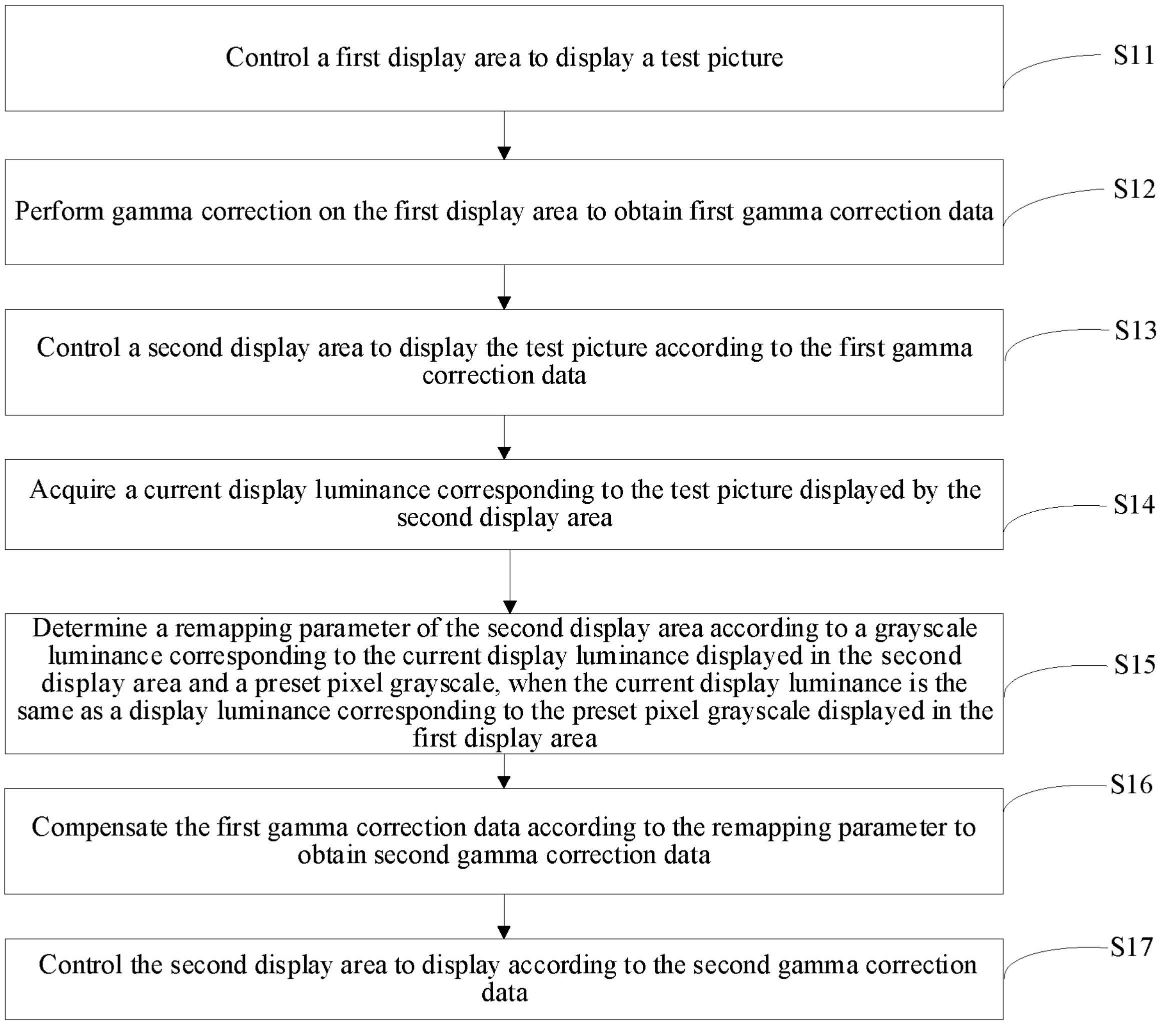
FIG. 6 is a schematic flowchart of a gamma correction method according to some implementations of the present application.

Referring to FIG. 6, the gamma correction method includes the following acts S11-S17.

In S11, a first display area is controlled to display a test picture.

In S12, gamma correction is performed on the first display area to obtain first gamma correction data.

In S13, a second display area is controlled to display the test picture according to the first gamma correction data.

In S14, a current display luminance corresponding to the test picture displayed by the second display area is acquired.

In S15, a remapping parameter of the second display area is determined based on a grayscale luminance corresponding to the current display luminance displayed in the second display area and a preset pixel grayscale, when the current display luminance is the same as a display luminance corresponding to the preset pixel grayscale displayed in the first display area.

In S16, the first gamma correction data is compensated according to the remapping parameter to obtain second gamma correction data.

In S17, the second display area is controlled to display according to the second gamma correction data.

Figure 2:
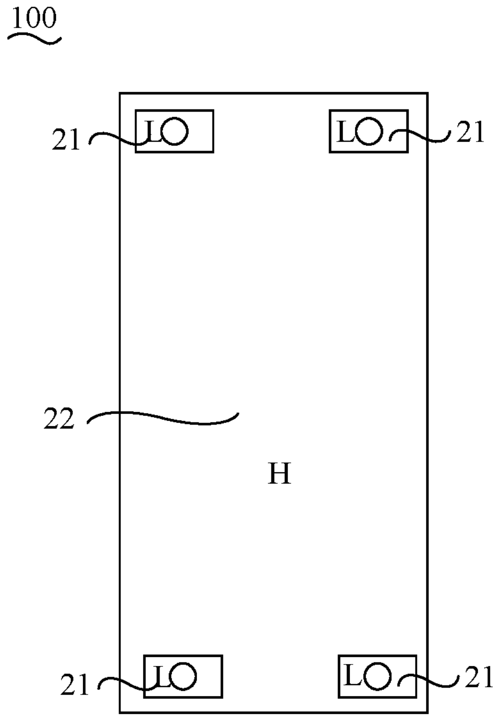
FIG. 2 is a schematic diagram of a structure of an electronic device according to some implementations of the present application.

The first display area 21 refers to a low-density pixel area (L area), and may be provided in an upper middle area of the display panel 20 (as shown in FIG. 1) or in four corner areas of the display panel 20 (as shown in FIG. 2). The second display area 22 refers to a high-density pixel area (H area), and is the other area other than the first display area 21 in the display panel 20. Herein, the first gamma correction data refers to data of a conversion correspondence relationship between input voltages and luminances obtained by performing gamma correction on L area.

The first display area (L area) is controlled to display a test picture. The test picture may be a pixel picture with a consistent color, such as a white picture, a red picture, a yellow picture, etc. The embodiments of the present application are explained by taking the test picture as the white picture as an example.

Gamma correction is performed on the first display area (L area) to obtain gamma correction data, that is, which is a process of adjusting the input voltage of L area to enable the luminance of L area to be at different pixel grayscales. After the gamma correction of L area is completed, the luminance and chrominance of L area meet a target specification. Specifically, referring to FIG. 3A or FIG. 3B, a collection apparatus 50 (a small probe gamma device) is electrically connected with a gamma correction apparatus 10, wherein the "electrically connected" may refer to a wireless connection or a wired connection, which is not limited herein. The collection apparatus 50 may be a device connected externally to the gamma correction apparatus 10 (as shown in FIG. 3A) or may be a device integrated with the gamma correction apparatus 10 (as shown in FIG. 3B). Therefore, when the gamma correction process is performed, first, a central region of L area is sensed by the collection apparatus 50 (e.g., the small probe gamma device) to collect luminance data corresponding to different input voltages of L area, and then by the gamma correction method of the present application luminance data collected by the small probe gamma device and corresponding input voltages of L area are acquired to obtain first gamma correction data, thereby realizing the gamma correction on the first display area L. The gamma correction refers to a gamma correction process in which the first gamma correction data obtained refers to data of a conversion correspondence relationship between input voltages and the luminances in L area of the screen. After the gamma correction of L area, H area uses the same first gamma correction data of L area to control H area to display, and the first gamma correction data is stored and burned in an IC chip.

The second display area is controlled to display the test picture according to the first gamma correction data, that is, an input voltage value corresponding to a preset pixel grayscale in the first gamma correction data is used to drive the second display area to display the test picture, and then the above-mentioned small probe gamma device is still used to collect the display luminance.

When a current display luminance corresponding to the test picture displayed in the second display area is acquired, the second display area uses the same first gamma correction data as the first display area, and a corresponding remapping parameter when the gamma correction parameter corresponding to the first display area is applied to the second display area may be determined according to the first gamma correction data, so that the second display area may compensate the gamma correction data using the remapping parameter to obtain the second gamma correction data. Thus, the second display area is controlled to achieve the same luminance and chrominance effect as the first display area with the same pixel grayscale.

Specifically, the second display area is controlled to display the test picture according to the first gamma correction data, that is, the input voltage of the display panel may be adjusted to control the second display area to display a target test picture corresponding to a preset pixel grayscale. For example, the preset pixel grayscale is grayscale binding points, such as the first grayscale, the second grayscale, the fifth grayscale, the tenth grayscale, the 20th grayscale, the 25th grayscale, the 30th grayscale, the 40th grayscale, the 50th grayscale and the 100th grayscale, and the like, and the target test picture is a display picture of the second display area, which corresponds to the preset pixel grayscale of the first display area. Then, the current display luminance corresponding to the target test picture of the second display area is obtained according to the target test picture. Herein, data of the current display luminance refers to a corresponding input voltage value U when luminance of H area is adjusted to luminance consistent with the current display luminance of L area.

The gamma correction method of the present application realizes gamma correction of different display regions in the display panel by compensating the first gamma correction data according to the remapping parameter to obtain the second gamma correction data, and can adjust the gamma characteristics of different regions to a consistent state without the addition of a device and a new chip.

Figure 7:
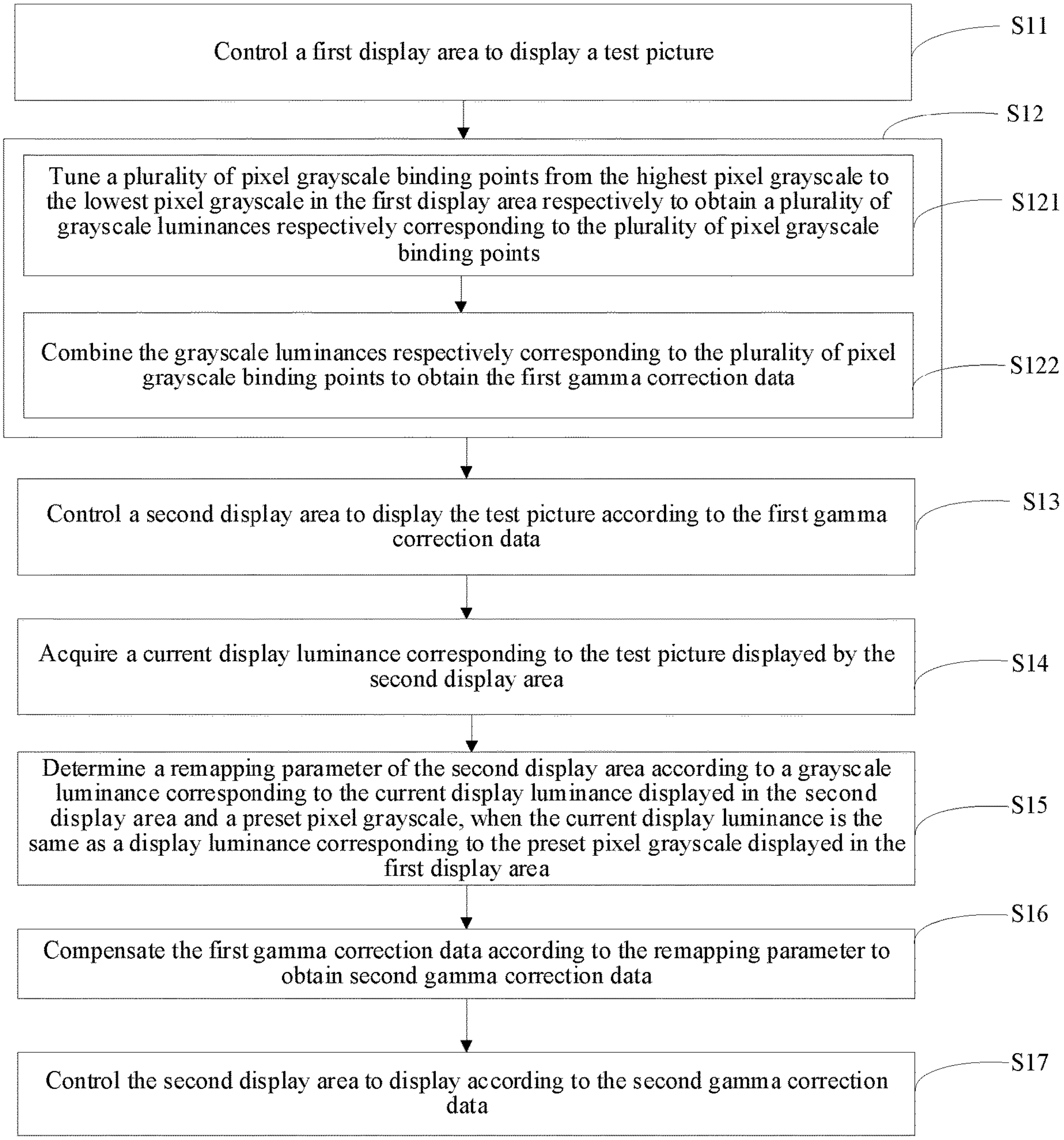
FIG. 7 is a schematic flowchart of a gamma correction method according to some implementations of the present application.

Referring to FIG. 7, in some embodiments, the act S12 includes following acts S121 and S122.

In S121, a plurality of pixel grayscale binding points from the highest pixel grayscale to the lowest pixel grayscale in the first display area are tuned respectively to obtain a plurality of grayscale luminances respectively corresponding to the plurality of pixel grayscale binding points.

In S122, the plurality of pixel grayscale binding points and the grayscale luminances respectively corresponding to the plurality of pixel grayscale binding points are combined to obtain the first gamma correction data.

Specifically, a plurality of pixel grayscale binding points from the highest pixel grayscale to the lowest pixel grayscale in the first display area (L area) are respectively tuned, that is, for example, if the highest pixel grayscale is the 255th grayscale and the lowest pixel grayscale is the 0th grayscale, there are a total of 256 grayscales, and the plurality of pixel grayscale binding points may be a plurality of grayscales taken from the 256 grayscales arbitrarily, for example, the plurality of pixel grayscale binding points may be five grayscales taken from the 256 grayscales, which are the 50th grayscale, the 100th grayscale, the 150th grayscale, the 200th grayscale and the 250th grayscale respectively. When the pixel grayscales displayed on a white picture of the first display area are the 50th grayscale, the 100th grayscale, the 150th grayscale, the 200th grayscale and the 250th grayscale respectively, the drive voltage values for driving the first display area to display are correspondingly tuned, and the corresponding five drive voltage values obtained are the grayscale luminances. The first gamma correction data is obtained by combining the five pixel grayscales with the corresponding five grayscale luminances, that is, the final first gamma correction data includes pixel grayscale values and corresponding grayscale luminances.

In some embodiments, the gamma correction method further includes: controlling the first display area to display according to the first gamma correction data based on a mura compensation algorithm.

Specifically, the principle of the mura compensation algorithm (Demura) is to brighten darker areas, or darken brighter areas, or eliminate areas with color deviation in a picture. The input grayscale refers to an original pixel grayscale of the image input to the first display area by the user, that is, a pixel grayscale of the image before gamma correction of the display region. The input grayscale is processed according to the mura compensation algorithm (Demura), that is, the original pixel grayscale is processed using the mura compensation algorithm to obtain the pixel grayscale after gamma correction in the first display area.

Herein, a calculation formula of the mura compensation algorithm (demura) is:

$$\text{Gray}_{-out}=\text{Gray}_{-in}*\text{Gain}+\text{Offset}$$

In the above formula, $\text{Gray}_{-out}$ represents an output grayscale (or referred to as a pixel grayscale), $\text{Gray}_{-in}$ represents an input grayscale, Gain represents a gain value, and Offset represents a compensation value.

Figure 8:
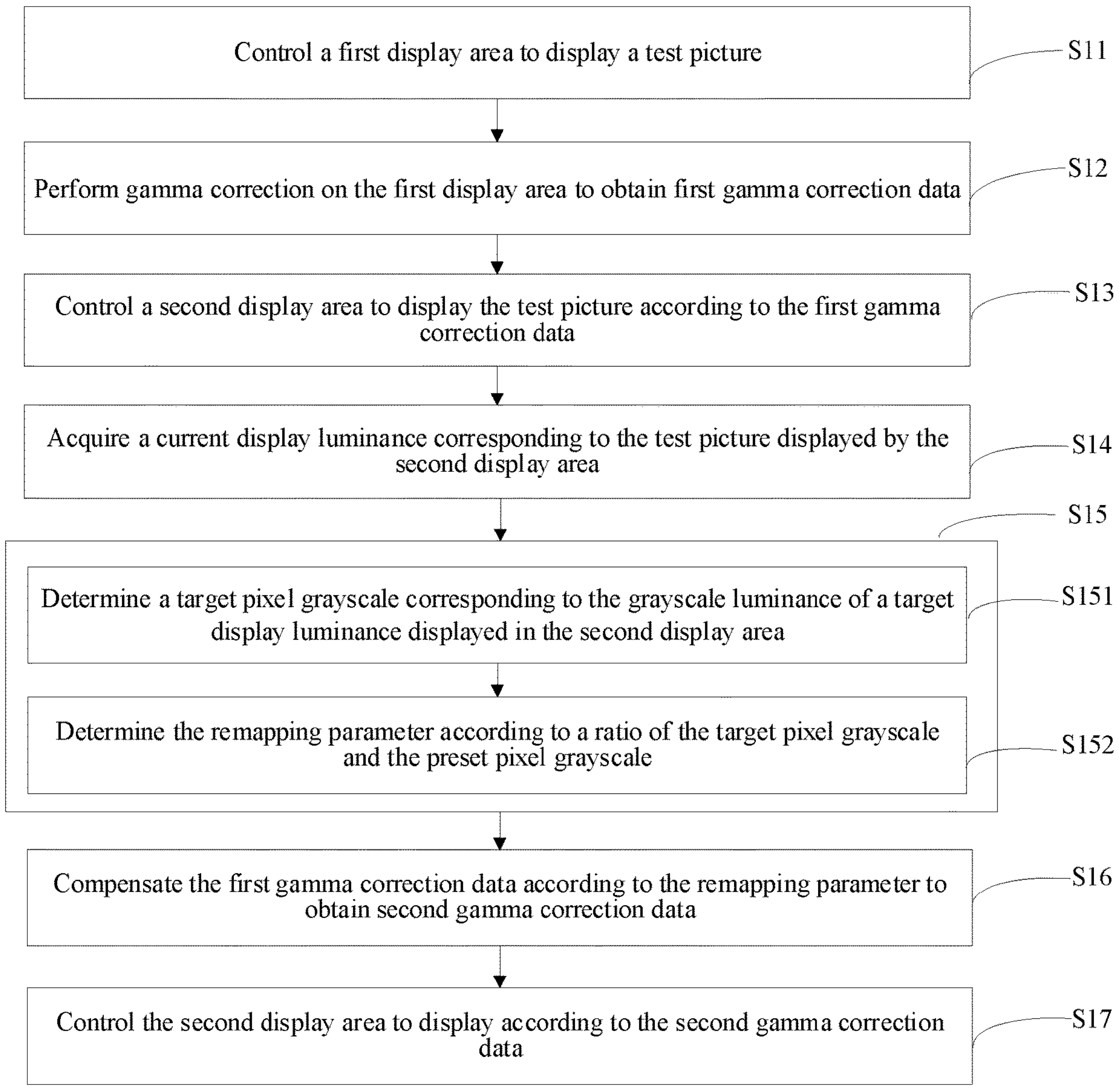
FIG. 8 is a schematic flowchart of a gamma correction method according to some implementations of the present application.

Referring to FIG. 8, in some embodiments, the act S15 includes following acts S151 and S152.

In S151, a target pixel grayscale corresponding to the grayscale luminance of the current display luminance displayed in the second display area is determined.

In S152, the remapping parameter is determined according to a ratio of the target pixel grayscale and the preset pixel grayscale.

It may be understood that since the arrangement modes of the sub-pixels in L area and H area are both GGRB (as shown in FIG. 4 and FIG. 5), there is no difference in H/L area in the contribution of each sub-pixel to the luminance of a white picture, except that the pixel density of L area is less, so the coordinates of the white picture in H area and L area are consistent in this case, but the luminance in H area is higher, therefore it is needed to readjust the data in H area. That is, it is needed to use the above gamma device to collect the current luminance data of H area, and determine the target pixel grayscale corresponding to the grayscale luminance of the current display luminance of H area using the calculation approach of the gamma correction data.

First, using the gamma correction method of the present application, a target pixel grayscale corresponding to a current display luminance of H area may be determined according to the following formula:

$$\frac{L_{vH\text{-}spec}}{L_{vi}}=\left(\frac{\text{Gray}_{H\text{-}spec}}{i}\right)^{Gamma}$$

Herein, $L_{vH\text{-}spec}$ is a grayscale luminance of a current display luminance displayed in the second display area (H area), $L_{vi}$ is a grayscale luminance corresponding to a preset pixel grayscale displayed in the first display area (L area), i is a value of the preset pixel grayscale, $\text{Gray}_{H\text{-}spec}$ is a target pixel grayscale corresponding to the grayscale luminance of the current display luminance displayed in H area, and Gamma is a gamma correction parameter value, that is, gamma correction index. The gamma correction parameter value may be 1.8, 2.0, 2.2, 2.4 and 2.6. Different gamma correction parameter values represent different values of luminance adjustment. Since Gamma 2.2 has been the current standard for Windows and Apple, and displays with Gamma 2.2 may produce almost optimal color, this level provides the best balance for true color, and is used as a standard for graphics and video professionals, therefore, the present application is illustrated by taking a case where the gamma correction parameter value Gamma is 2.2 as an example.

Specifically, taking the current luminance value of H area at a preset pixel grayscale of 255 as an example, a gray scale at which the current display luminance specification of H area is located is first determined according to the following formula:

$$\frac{L_{vH\text{-}spec}}{L_{v255}} = \left(\frac{\text{Gray}_{H\text{-}spec}}{255}\right)^{Gamma}$$

Herein, $L_{vH\text{-}spec}$ is a grayscale luminance of a current display luminance displayed in the second display area (H area), $L_{v255}$ is a grayscale luminance corresponding to a preset pixel grayscale displayed in the first display area (L area) when the preset pixel grayscale is 255, $\text{Gray}_{H\text{-}spec}$ is a target pixel grayscale corresponding to the grayscale luminance of the current display luminance displayed in H area, and Gamma is a gamma correction parameter value, that is, gamma correction index. The gamma correction parameter value may be 1.8, 2.0, 2.2, 2.4 and 2.6. Different gamma correction parameter values represent different values of luminance adjustment. Since Gamma 2.2 has been the current standard for Windows and Apple, and displays with Gamma 2.2 may produce almost optimal color, this level provides the best balance for true color, and is used as a standard for graphics and video professionals, therefore, the present application is illustrated by taking a case where the gamma correction parameter value Gamma is 2.2 as an example.

Then, a value of the remapping parameter Remap may be calculated according to the following conditional formula:

$$\text{Remap}=\text{Gray}_{H\text{-}spec}/255$$

Assuming that the 239th grayscale of H area is the current display luminance data at this time, the remapping parameter Remap is 239/255. In the post-processing flow of demura, a gain value (Gain) of a position in the H area is defined as remap*Gain. In this case, the display grayscale Gray-out output after gamma correction of H area may be expressed as the following formula:

$$\text{Gray}_{\text{-}out}=\text{Gray}_{\text{-}in}*\text{Remap}*\text{Gain}+\text{Offset}$$

In addition, a display grayscale Gray-out output after gamma correction of L area may be expressed as the following formula:

$$\text{Gray}_{\text{-}out}=\text{Gray}_{\text{-}in}*\text{Gain}+\text{Offset}$$

In the above formulas, $\text{Gray}_{\text{-}out}$ represents an output grayscale, $\text{Gray}_{\text{-}in}$ represents an input grayscale, Gain represents a gain value, and Offset represents a compensation value.

It may be understood that the mura compensation algorithm (demura) is to brighten areas which it considers darker, or darken brighter areas which it considers brighter, or eliminate areas which it considers having color deviation. The ultimate goal is to make different areas in the display panel have roughly the same color, which requires a smooth demura algorithm to eliminate Mura boundaries.

Then, a remapping parameter (remap) of the second display area (H area) is determined based on the current display luminance and the preset pixel grayscale, and the remapping parameter (remap) may be a ratio of a grayscale value corresponding to the current display luminance value and a grayscale value corresponding to the current luminance value. For example, when the input voltage value is U, the luminance value of the first display area (L area) is the luminance value L1 that meets the target specification, and due to the larger pixel density of H area, the current display luminance value of the second display area (H area) will be larger than the luminance value L1, which is assumed to be the luminance value L2, for example, the grayscale corresponding to the luminance value L2 is the 255th grayscale, in this case, the luminance value L1 is used as the current display luminance value of the second display area (H area), and the corresponding grayscale value obtained according to the gamma characteristic curve is the 239th grayscale, and the remapping parameter remap equal to 239/255 is obtained.

Figure 9:
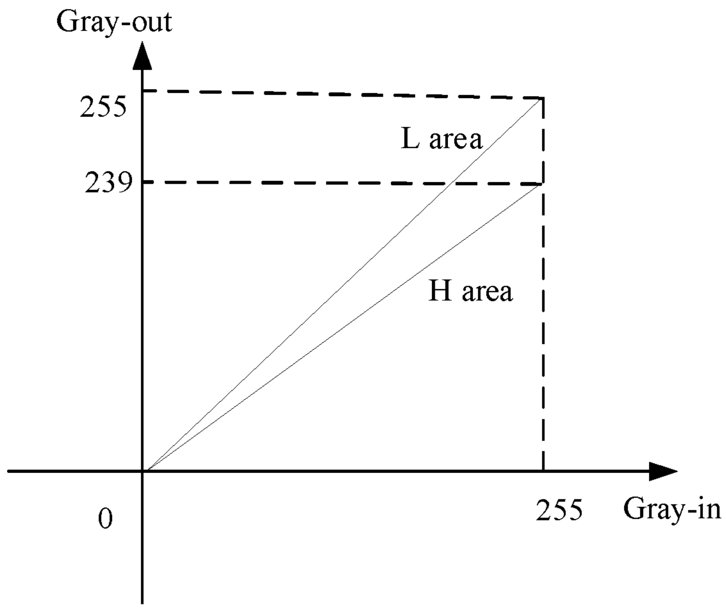
FIG. 9 is a schematic diagram of a relationship between an input grayscale and an output grayscale in a gamma correction method according to some implementations of the present application.

After that, the pixel grayscale of the first gamma correction data is compensated according to the remapping parameter to obtain the second gamma correction data. It may be understood that, as shown in FIG. 9, when the input grayscale of L area is the 255th grayscale, the output grayscale of L area is the 255th grayscale. However, when the input grayscale (pixel grayscale) of H area is the 255th grayscale, since the pixel density of H area is larger than that of L area, the pixel grayscale of the first gamma correction data is compensated according to the remapping parameter, that is, the pixel grayscale of H area is 255 times the remap. Since the remap=239/255, the output grayscale of H area in this case is the 239th grayscale, wherein the input voltage corresponding to the 239th grayscale and the 239th grayscale are one of the data groups of the second gamma correction data. By analogy, the remaining input grayscales of the pixel points in H area are multiplied by the remapping parameter remap to obtain the second gamma correction data of the second display area (H area). The second display area is then controlled to display according to the second gamma correction data based on the mura compensation algorithm.

Figure 10:
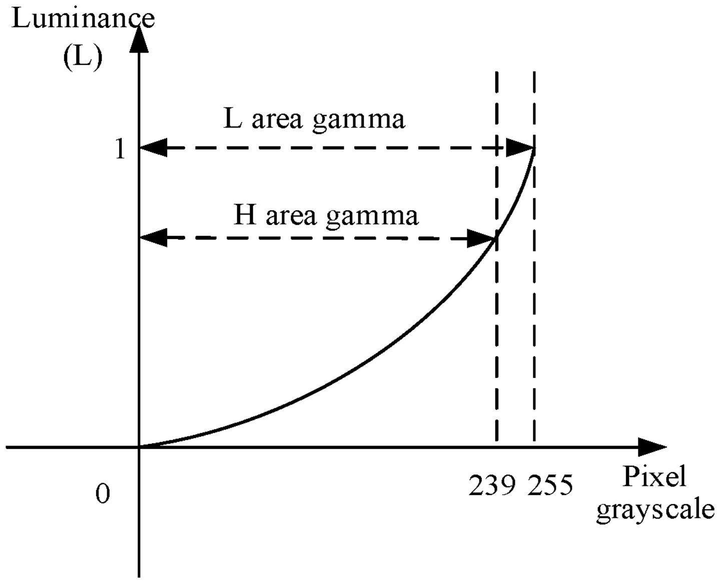
FIG. 10 is a schematic diagram of a relationship between a pixel grayscale and a luminance of a display area in a gamma correction method according to some implementations of the present application.
Figure 11:
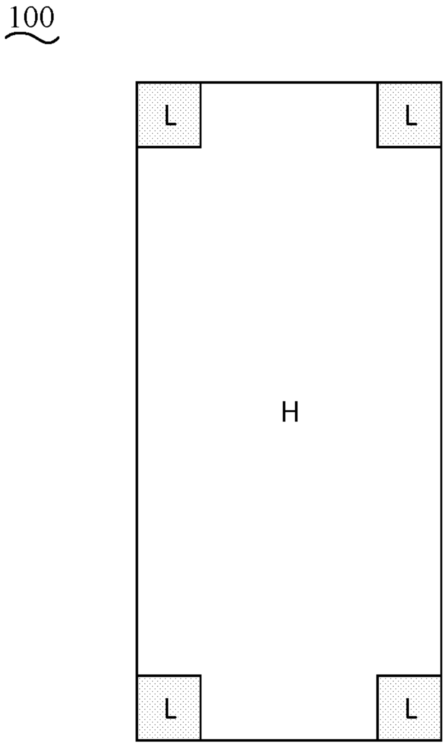
FIG. 11 is a schematic diagram of a scenario of a gamma correction method according to some implementations of the present application.

L area and H area compensated by the remapping parameter and mura compensation algorithm can meet gamma 2.2 curve (as shown in FIG. 10), and the current display luminance and chrominance are consistent with the target specification requirements, as shown in FIG. 11, which illustrates a white picture result simulated by matlab using this principle. Herein, the gamma 2.2 curve is a gamma correction target specification curve preset by the user, which may also be a gamma 2.4 curve or other gamma curves, which is not limited herein.

In the present application, the remapping parameter remap of the second display area is determined according to the current display luminance data, the first gamma correction data obtained after gamma correction of L area is compensated according to the remapping parameter remap to obtain the second gamma correction data, and then the second display area is controlled to display according to the second gamma correction data based on the mura compensation algorithm. Finally, both L area and H area of the display panel can meet the gamma 2.2 curve, so that the current display luminance and chrominance of the whole display panel are consistent with the target specification requirements.

Figure 12:
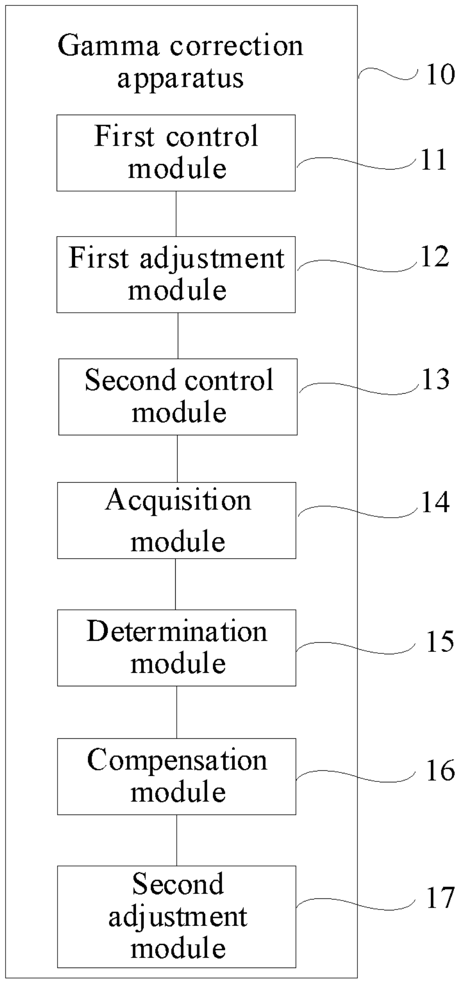
FIG. 12 is a schematic diagram of a structure of a gamma correction apparatus according to some implementations of the present application.

In order to realize the above embodiments, referring to FIG. 12, the present application also provides a gamma correction apparatus 10 for a display panel. Referring to FIG. 3A or FIG. 3B, the gamma correction apparatus 10 is electrically connected with the collection apparatus 50, wherein the "electrically connected" may refer to a wireless connection or a wired connection, which is not limited herein. The collection apparatus 50 may be an apparatus electrically and externally connected with the gamma correction apparatus 10 (as shown in FIG. 3A), or may be an apparatus integrated with the gamma correction apparatus 10 and electrically connected with the gamma correction apparatus 10 (as shown in FIG. 3B). The display panel includes a first display area and a second display area, wherein a pixel density of the first display area is less than a pixel density of the second display area. The gamma correction apparatus 10 includes a first control module 11, a first adjustment module 12, a second control module 13, an acquisition module 14, a determination module 15, a compensation module 16, and a second adjustment module 17. The first control module 11 is configured to control the first display area to display a test picture. The first adjustment module 12 is configured to perform gamma correction on the first display area to obtain first gamma correction data. The second control module 13 is configured to control the second display area to display the test picture according to the first gamma correction data. The acquisition module 14 is configured to acquire a current display luminance which corresponds to the test picture displayed by the second display area and is collected by the collection apparatus. The determination module 15 is configured to determine a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area. The compensation module 16 is configured to compensate the first gamma correction data according to the remapping parameter to obtain the second gamma correction data. The second adjustment module 17 is configured to control the second display area to display according to the second gamma correction data.

Figure 13:
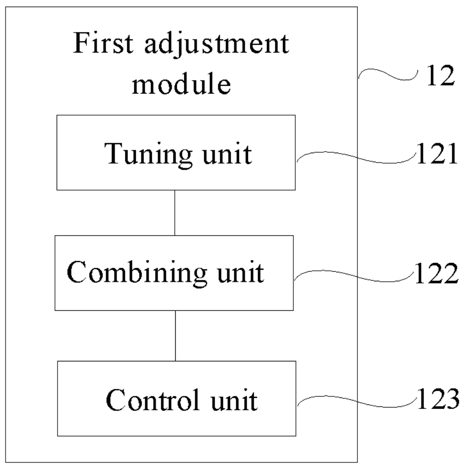
FIG. 13 is a schematic diagram of a structure of a first adjustment module in a gamma correction apparatus according to some implementations of the present application.

In an embodiment of the present application, referring to FIG. 13, the first adjustment module 12 further includes a tuning unit 121 and a combining unit 122. The tuning unit 121 is configured to tune a plurality of pixel grayscale binding points from the highest pixel grayscale to the lowest pixel grayscale in the first display area respectively to obtain a plurality of grayscale luminances corresponding to the plurality of pixel grayscale binding points respectively. The combining unit 122 is configured to combine the plurality of pixel grayscale binding points and the grayscale luminances respectively corresponding to the plurality of pixel grayscale binding points to obtain the first gamma correction data.

In an embodiment of the present application, referring to FIG. 13, the first adjustment module 12 further includes a control unit 123. The control unit 123 is configured to control the first display area to display according to the first gamma correction data based on a mura compensation algorithm.

Figure 14:
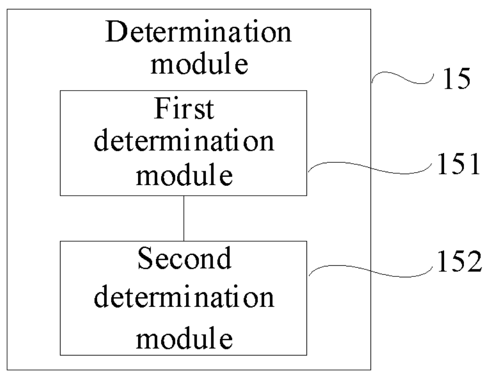
FIG. 14 is a schematic diagram of a structure of a determination module in a gamma correction apparatus according to some implementations of the present application.

In an embodiment of the present application, referring to FIG. 14, the determination module 15 includes a first determination unit 151 and a second determination unit 152. The first determination unit 151 is configured to determine a target pixel grayscale corresponding to the grayscale luminance of the current display luminance displayed in the second display area, and the second determination unit 152 is configured to determine the remapping parameter according to a ratio of the target pixel grayscale and the preset pixel grayscale.

The gamma correction apparatus 10 of the present application realizes gamma correction of different display regions in the display panel by compensating the first gamma correction data according to the remapping parameter to obtain the second gamma correction data, and can adjust the gamma characteristics of different regions to a consistent state without the addition of a device and a new chip.

Figure 15:
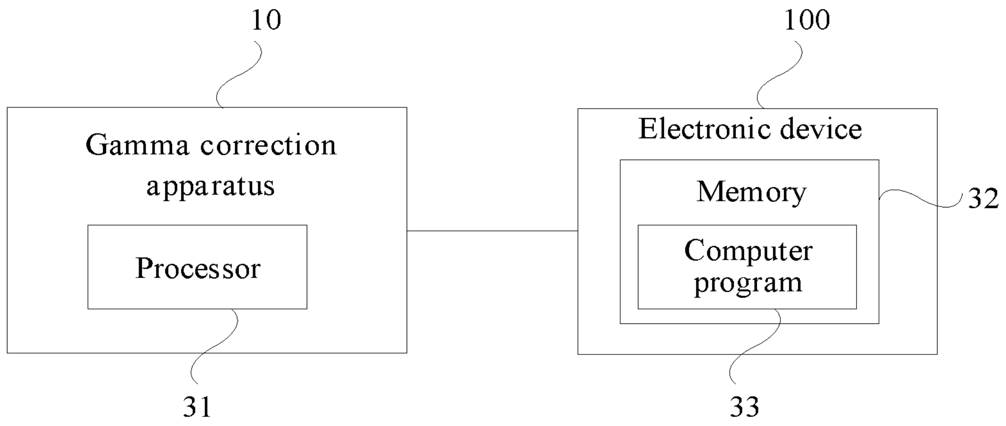
FIG. 15 is a schematic diagram of a structure of an electronic device according to some implementations of the present application.

Referring to FIG. 15, the present application also provides an electronic device 100. The electronic device 100 includes a processor 31 and a memory 32 storing a computer program 33 which, when the computer program 33 is executed by the processor 31, following acts are performed: controlling the first display area to display a test picture; performing gamma correction on the first display area to obtain first gamma correction data; controlling the second display area to display the test picture according to the first gamma correction data; acquiring a current display luminance corresponding to the test picture displayed by the second display area; determining a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area; compensating the first gamma correction data according to the remapping parameter to obtain second gamma correction data; and controlling the second display area to display according to the second gamma correction data. The electronic device 100 is for example a smart device with a display panel, such as a computer, a mobile phone, an ipad, a tablet learning machine, or a game machine, which is not listed one by one here.

In an embodiment of the present application, the processor 31 is further configured to: tune a plurality of pixel grayscale binding points from the highest pixel grayscale to the lowest pixel grayscale in the first display area respectively to obtain a plurality of grayscale luminances respectively corresponding to the plurality of pixel grayscale binding points; combining the plurality of pixel grayscale binding points and the grayscale luminances respectively corresponding to the plurality of pixel grayscale binding points to obtain the first gamma correction data.

In an embodiment of the present application, the processor 31 is further configured to control the first display area to display according to the first gamma correction data based on a mura compensation algorithm.

Figure 16:
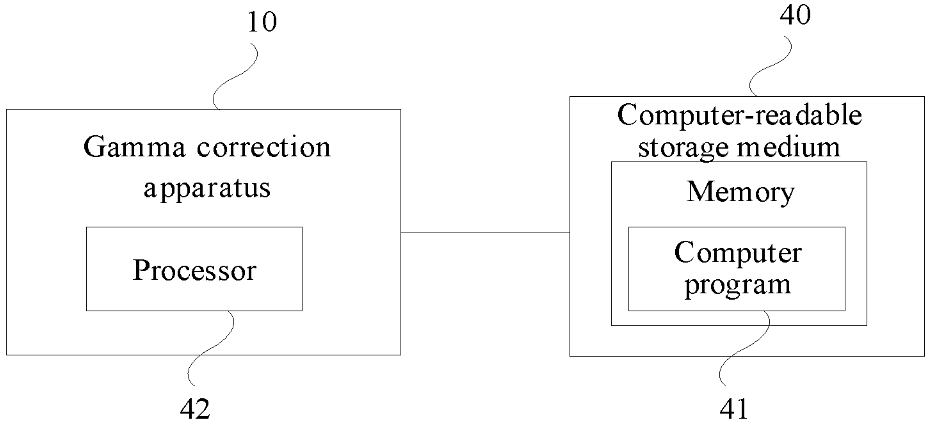
FIG. 16 is a schematic diagram of a structure of a computer-readable storage medium according to some implementations of the present application.

In an embodiment of the present application, referring to FIG. 16, the present application also provides a non-volatile computer-readable storage medium 40 for a computer program having a computer program 41 stored thereon.

The computer program 41, when executed by one or more processors 42, implements the acts of the gamma correction method of any of the above implementations.

For example, the program, when executed by the processor 42, implements the following acts of the gamma correction method.

In S11, the first display area is controlled to display a test picture.

In S12, gamma correction is performed on the first display area to obtain first gamma correction data.

In S13, a second display area is controlled to display the test picture according to the first gamma correction data.

In S14, a current display luminance corresponding to the test picture displayed by the second display area is acquired.

In S15, a remapping parameter of the second display area is determined based on a grayscale luminance corresponding to the current display luminance displayed in the second display area and a preset pixel grayscale, when the current display luminance is the same as a display luminance corresponding to the preset pixel grayscale displayed in the first display area.

In S16, the first gamma correction data is compensated according to the remapping parameter to obtain second gamma correction data.

In S17, the second display area is controlled to display according to the second gamma correction data.

The computer-readable storage medium 40 may be disposed within the processor 42 or a data source reader. In this case, the processor 42 or the data source reader can communicate with a cloud server to retrieve the corresponding computer program 41.

It may be understood that the computer program 41 includes a computer program code. The computer program code may be in source code form, object code form, executable file or some intermediate form. The computer-readable storage medium may include any entity or apparatus capable of carrying computer program code, recording medium, an USB flash drive, a removable hard disk, a magnetic disk, an optical disk, a computer memory, a Read-Only Memory (ROM), a Random Access Memory (RAM), a software distribution medium, etc.

By realizing gamma correction of different pixel regions in a novel display panel (AMOLED), the gamma correction method and apparatus, electronic device, and readable storage medium according to the present application can adjust the gamma characteristics of different regions of the novel display panel to a consistent state without the addition of a gamma correction device and a new chip, and the luminance and chrominance of the panel meet the target specification and the mass production performance is high.

The gamma correction method and apparatus, electronic device, and readable storage medium according to the present application realizes gamma correction of different display regions in the display panel by compensating the first gamma correction data according to the remapping parameter to obtain the second gamma correction data, and can adjust the gamma characteristics of different regions to a consistent state without the addition of a device and a new chip.

The invention claimed is:

1. A gamma correction method for a display panel, wherein the display panel comprises a first display area and a second display area, a pixel density of the first display area is less than a pixel density of the second display area, and the gamma correction method comprises:

controlling the first display area to display a test picture;

performing gamma correction on the first display area to obtain first gamma correction data;

controlling the second display area to display the test picture according to the first gamma correction data;

acquiring a current display luminance corresponding to the test picture displayed by the second display area;

determining a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area;

compensating the first gamma correction data according to the remapping parameter to obtain second gamma correction data; and controlling the second display area to display according to the second gamma correction data.

2. The gamma correction method according to claim 1, wherein determining the remapping parameter of the second display area based on the grayscale luminance corresponding to the current display luminance displayed in the second display area and the preset pixel grayscale, comprises:

determining a target pixel grayscale corresponding to the grayscale luminance of the current display luminance displayed in the second display area;

determining the remapping parameter according to a ratio of the target pixel grayscale and the preset pixel grayscale.

3. The gamma correction method according to claim 2, wherein the target pixel grayscale corresponding to the grayscale luminance of the current display luminance displayed in the second display area is calculated by the following conditional formula:

$$\frac{L_{vH-spec}}{L_{vi}} = \left(\frac{\mathrm{Gray}_{H-spec}}{i}\right)^{Gamma}$$

wherein, $L_{vH-spec}$ is the grayscale luminance of the current display luminance displayed in the second display area, $L_{vi}$ is a grayscale luminance corresponding to the preset pixel grayscale displayed in the first display area, i is a value of the preset pixel grayscale, $\mathrm{Gray}_{H-spec}$ is the target pixel grayscale corresponding to the grayscale luminance of the current display luminance displayed in the second display area, and Gamma is a gamma correction parameter value.

4. The gamma correction method according to claim 1, wherein compensating the first gamma correction data according to the remapping parameter to obtain the second gamma correction data comprises:

compensating a pixel grayscale of the first gamma correction data according to the remapping parameter to obtain the second gamma correction data.

5. The gamma correction method according to claim 1, wherein controlling the second display area to display according to the second gamma correction data comprises:

controlling the second display area to display according to the second gamma correction data based on a mura compensation algorithm.

6. The gamma correction method according to claim 1, wherein performing the gamma correction on the first display area to obtain the first gamma correction data comprises:

tuning a plurality of pixel grayscale binding points from a highest pixel grayscale to a lowest pixel grayscale in the first display area respectively to obtain a plurality of grayscale luminances respectively corresponding to the plurality of pixel grayscale binding points;

combining the plurality of pixel grayscale binding points and the grayscale luminances respectively corresponding to the plurality of pixel grayscale binding points to obtain the first gamma correction data.

7. The gamma correction method according to claim 6, further comprising:

controlling the first display area to display according to the first gamma correction data based on a mura compensation algorithm.

8. The gamma correction method according to claim 1, wherein the pixel density of the first display area is a half of the pixel density of the second display area.

9. The gamma correction method according to claim 1, wherein the first display area is provided in an upper middle area of the display panel, or in four corner areas of the display panel.

10. The gamma correction method according to claim 1, wherein the first gamma correction data refers to data of a conversion correspondence relationship between input voltages and luminances obtained by performing the gamma correction on the first display area.

11. A gamma correction apparatus for a display panel, wherein the gamma correction apparatus is electrically connected with a collection apparatus, the display panel comprises a first display area and a second display area, a pixel density of the first display area is less than a pixel density of the second display area, and the gamma correction apparatus comprises:

a processor, configured to control the first display area to display a test picture;

perform gamma correction on the first display area to obtain first gamma correction data;

control the second display area to display the test picture according to the first gamma correction data;

acquire a current display luminance which corresponds to the test picture displayed by the second display area and is collected by the collection apparatus;

determine a remapping parameter of the second display area based on a grayscale luminance corresponding to the current display luminance displayed in the second display area and a preset pixel grayscale, when the current display luminance is the same as a display luminance corresponding to the preset pixel grayscale displayed in the first display area;

compensate the first gamma correction data according to the remapping parameter to obtain second gamma correction data; and control the second display area to display according to the second gamma correction data.

12. The gamma correction apparatus according to claim 11, wherein the processor is configured to determine a target pixel grayscale corresponding to the grayscale luminance of the current display luminance displayed in the second display area, and determine the remapping parameter according to a ratio of the target pixel grayscale and the preset pixel grayscale.

13. The gamma correction apparatus according to claim 11, wherein the processor is configured to compensate a pixel grayscale of the first gamma correction data according to the remapping parameter to obtain the second gamma correction data.

14. The gamma correction apparatus according to claim 11, wherein the processor is configured to control the second display area to display according to the second gamma correction data based on a mura compensation algorithm.

15. The gamma correction apparatus according to claim 11, wherein the processor is configured to tune a plurality of pixel grayscale binding points from a highest pixel grayscale to a lowest pixel grayscale in the first display area respectively to obtain a plurality of grayscale luminances respectively corresponding to the plurality of pixel grayscale binding points; and combine the plurality of pixel grayscale binding points and the grayscale luminances respectively corresponding to the plurality of pixel grayscale binding points to obtain the first gamma correction data.

16. The gamma correction apparatus according to claim 15, wherein the processor is configured to control the first display area to display according to the first gamma correction data based on a mura compensation algorithm.

17. The gamma correction apparatus according to claim 11, wherein the pixel density of the first display area is a half of the pixel density of the second display area.

18. The gamma correction apparatus according to claim 11, wherein the first display area is provided in an upper middle area of the display panel, or in four corner areas of the display panel.

19. An electronic device, comprising a processor and a memory storing a computer program, when the computer program is executed by the processor, the gamma correction method of claim 1 is implemented.

20. A non-volatile computer-readable storage medium for a computer program, wherein the gamma correction method of claim 1 is implemented when the computer program is executed by one or more processors.

* * * * *